Feb. 21, 1933.   S. P. COWARDIN ET AL   1,898,763
ATOMIZER
Filed Sept. 28, 1929   2 Sheets-Sheet 2
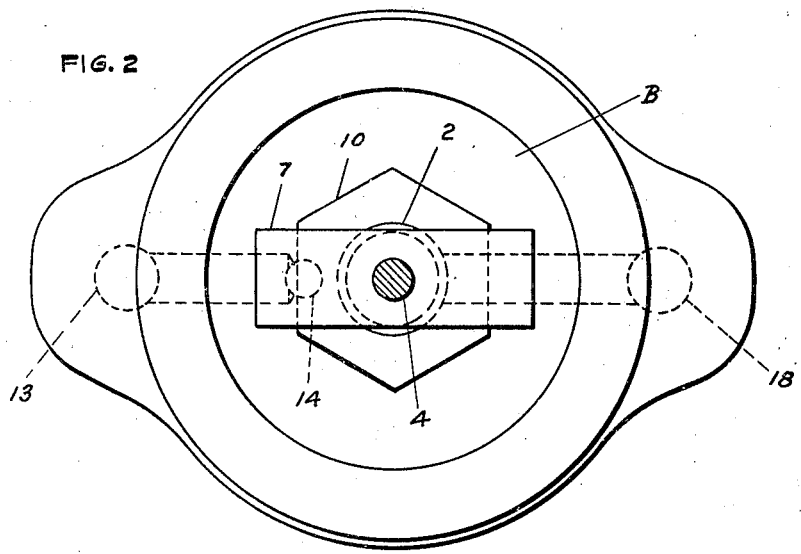
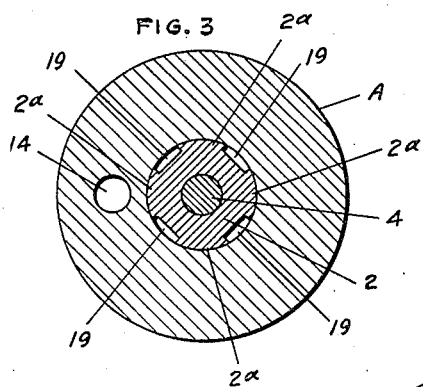
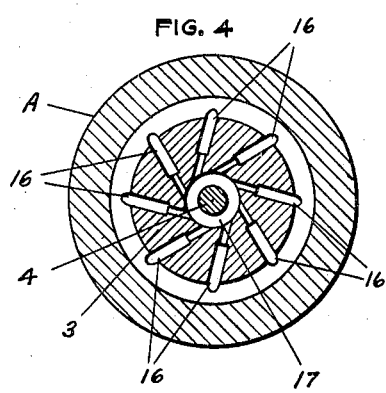
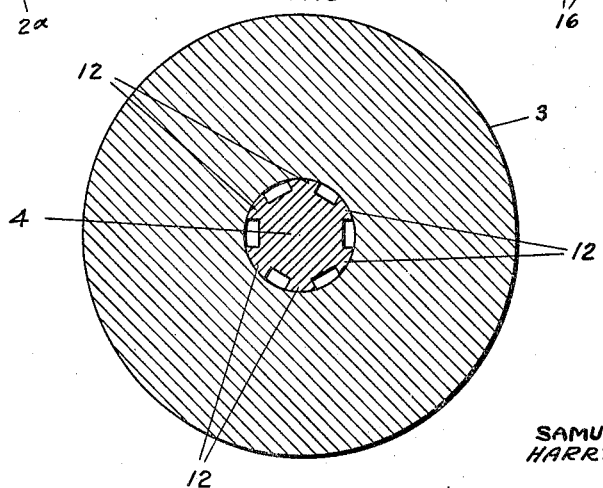
INVENTORS
SAMUEL P. COWARDIN,
HARRY A. COWARDIN,
BY Toulmin & Toulmin
ATTORNEYS Patented Feb. 21, 1933

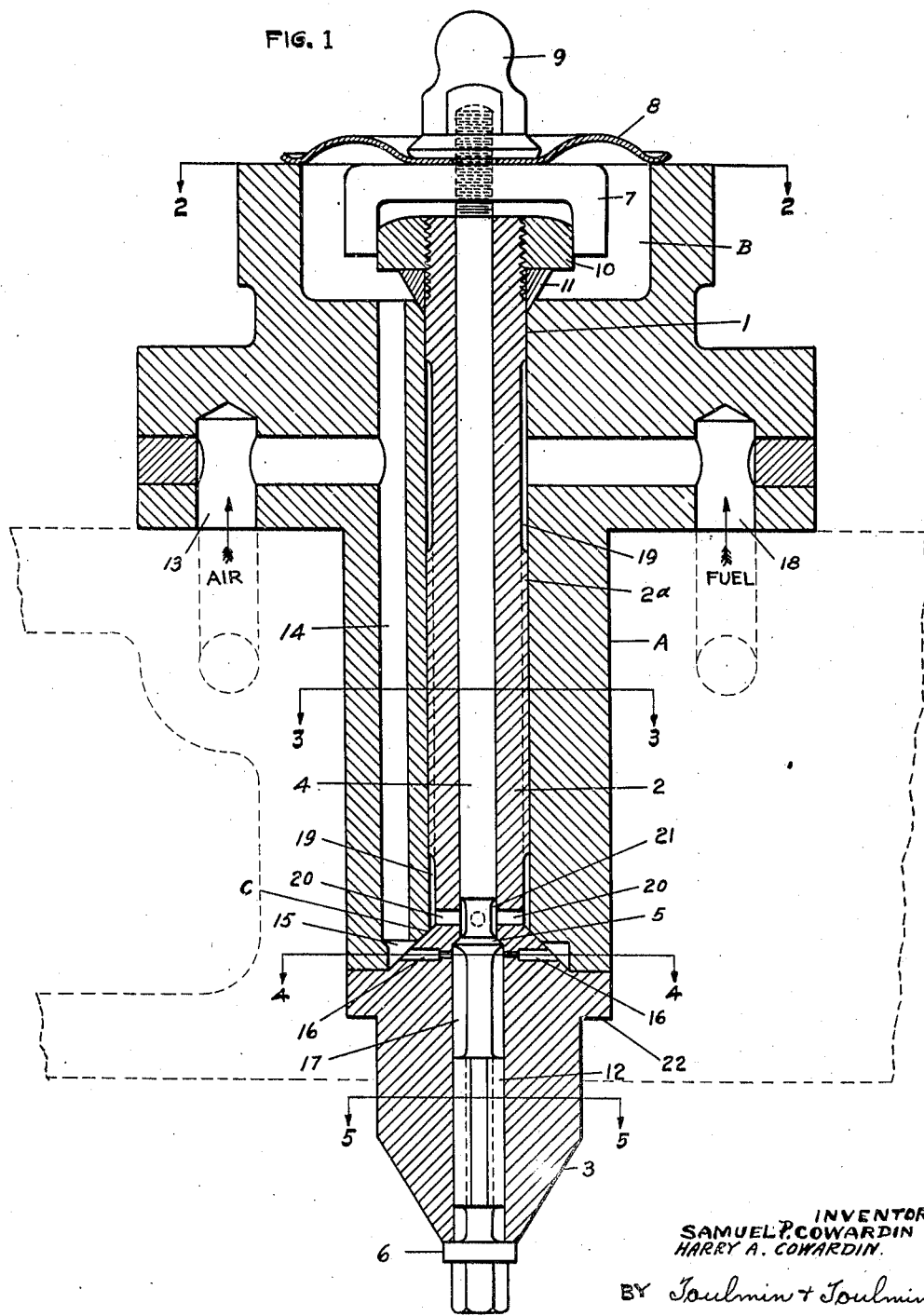

1,898,763

UNITED STATES PATENT OFFICE

SAMUEL P. COWARDIN AND HARRY A. COWARDIN, OF RICHMOND, VIRGINIA

ATOMIZER

Application filed September 28, 1929. Serial No. 395,907.

This invention relates to atomizers, and has for its purpose the reduction of oil to a fog-like mixture and the injection of such mixture into the cylinder of an engine.

It is an object of this invention to provide an atomizer with means for conducting heat away from the atomizer point to avoid the carbonizing of the oil in the passages and mixing chamber located in the point of the atomizer.

It is also the purpose of this invention to provide a stem for operating the oil valve and the mixture valve, with guides thereon for the purpose of securing a perfect alignment of the stem and to provide passages for the mixture of air and oil.

It is also an object of this invention to provide the upper or outer end of the valve stem with a ball and socket connection for the purpose of giving the maximum of bearing contact surface and eliminating wear and therefore affording a fixed and permanent adjustment of the parts.

These and other advantages will appear from the description taken in connection with the accompanying drawings.

Referring to the drawings:

Figure 1 is a longitudinal section through the atomizer showing the various parts and their relations to each other.

Figure 2 is a section on the line 2—2 of Figure 1.

Figure 3 is a section on the line 3—3 of Figure 1.

Figure 4 is a section on the line 4—4 of Figure 1.

Figure 5 is a section on the line 5—5 of Figure 1.

The atomizer is composed essentially of a body member indicated by the reference character A. In one end of this body is a cylindrical cavity indicated by the letter B, while in the other end there is a cone-shaped cavity indicated by the letter C.

Connecting these two cavities and extending entirely through the full length of the body is a cylindrical hole 1. Within this cylindrical hole 1 is an atomizer sleeve 2 which has adjacent one end thereof a series of grooves running longitudinally of the sleeve and forming thereon aligning and guiding ribs 2a.

On one end of the sleeve is an atomizer sleeve tip 3. The sleeve and the atomizer sleeve tip have extending therethrough a hole in which there is located a valve rod 4. This valve rod has thereon, indicated by the numeral 5, an oil valve which seats in a co-acting oil seat formed in the sleeve adjacent where the sleeve and the atomizer sleeve tip unite. The sleeve and tip are formed of one piece.

There is found on one end of the valve rod an air valve 6 which cooperates with the seat on the end of the sleeve tip for forming a closure for controlling the ejection of a mixture of oil and air. On the end of the valve rod remote from the air valve is a nut 7. This nut has each end turned downward for a purpose hereinafter described. Fitting over the screw threaded end of the valve rod is a diaphragm member 8. This diaphragm member is held on the end of the valve rod by means of a diaphragm nut which has on the outer end thereof a ball 9. This diaphragm is circular in shape, with the outer edges thereof resting upon the walls of the cavity B. This diaphragm is resilient and has for one of its objects the holding of the valves 5 and 6 seated in their proper seats.

The end of the atomizer sleeve remote from the sleeve tip is screw threaded and has thereon a sleeve securing nut 10. The downward turned ends of nut 7 fit loosely over the flats of nut 10 and prevent nut 10 from turning when the diaphragm nut is tightened.

Located around the atomizer sleeve and fitting within the cone-shaped cavity around one end of the cylindrical hole 1, adjacent the cavity B is an atomizer stem ferrule 11. One purpose of this ferrule is to prevent leakage of air downward or oil upward along the atomizer sleeve and another purpose is to align the sleeve 2 in the body.

On the valve stem between the oil valve and the air valve there is located a plurality of guides 12. The purpose of these guides is to center the valve stem accurately in the atomizer sleeve and check the whirling of the oil and air mixture. The reference character 13 is used to indicate an air inlet. This air inlet leads to a passageway 14 which passes into an annular chamber 15. This chamber 15 is an air chamber and has extending therefrom tangentially a plurality of tuyères or passageways 16 leading into a mixing chamber 17. This mixing chamber is in the sleeve tip and forms part of the passageway extending through the sleeve tip and the atomizer sleeve.

It will be noticed that the tuyères or passageways 16 as they leave the annular chamber 15 are large but as they approach the mixing chamber they are very small so that the air as it enters the mixing chamber enters in very fine jets well adapted to break up the oil into finely divided particles.

It will also be observed that the drill hole 14 opens into the cavity B. By this means air pressure is at all times applied to the under side of diaphragm 8, thereby exerting an upward pull on the valve stem, resulting in the valves being closed except when mechanically opened by external pressure applied to the ball 9.

The oil is admitted through an inlet 18 and passes therefrom into an oil passageway 19. This passageway is formed by a reduced part of the atomizer sleeve adjacent the point where the oil enters from the oil inlet. This passageway is restricted through a part of its length by the ribs 2a, heretofore mentioned. From the passageway 19 the oil enters by means of oil ducts 20 into an oil chamber 21. This chamber 21 is formed by reducing the diameter of the valve rod at the point adjacent the ducts 20.

The valve rod is operated by some lever or other member contacting with the ball 9 on the end of the nut that fits over the end of the valve rod. If pressure is brought upon the ball 9 the whole valve rod is moved, thereby opening both the oil valve 5 and the air valve 6 against the action of the diaphragm 8 and the air pressure in B.

After the parts are properly assembled the valve stem, the nut 7, the diaphragm 8 and the ball nut 9 are the only parts that move. The atomizer sleeve is held in permanent fixed relation to the body by means of the nut 10, which engages the atomizer stem ferrule 11 and forces it into engagement with the sleeve and the adjacent part of the body.

The material used in the manufacture of this atomizer may be such as is desired. Ordinarily the body and the atomizer sleeve and sleeve tip are formed of steel. The atomizer stem ferrule may be composed of any other material, for instance, brass, while the diaphragm may be composed of any suitable resilient material, such as phosphor bronze.

For the purpose of forming a close fit between the cylinder head and the atomizer there is formed on the valve end of the sleeve a shoulder 22. The part of the atomizer that projects within the cylinder head is that part of the sleeve tip beyond the shoulder 22. By this means the oil valve is without the cylinder head and is remote from heat so that there is little danger of the oil around the oil valve and in the oil chamber being carbonized.

It will be observed that there is a head of oil at all times within the oil chamber, and that the air is at all times present in the mixing chamber. When the valve stem is operated for the purpose of opening the oil valve and the discharge valve 6, the oil enters the mixing chamber around the valve in a conical sheet and as it thus enters small jets of air strike this sheet of oil tangentially so that the oil is given a whirling and twisting motion, whereby the oil is divided into fine particles, whereby a state of mixture is produced in the form of a fog-like mixture.

We desire to comprehend within our invention such modifications as may be clearly embraced within our claims and the scope of our invention.

This application is a continuation in part of our application Serial No. 703,972, filed April 3, 1924, now Patent No. 1,771,875, dated July 29, 1930, and differs from that case in novel features and combinations defined by the claims of the present application.

Having thus fully described our invention, what we claim is new and desire to secure by Letters Patent, is:

1. In an atomizer, a body member having a hole therethrough, a sleeve in said hole, said sleeve having a tip on one end engaging said body member, a nut on the other end of said sleeve, and an annular aligning member surrounding said sleeve and located between said nut and the body member and serving to prevent passage of oil and air around the upper end of the sleeve.

2. In an atomizer, a body member having a hole therethrough, a sleeve in said hole, said sleeve having a tip on one end engaging said body member, said sleeve having therein a mixing chamber and a plurality of valve seats, a valve rod in said sleeve having thereon valves for said valve seats, a nut on the other end of said sleeve and a nut on said rod having a projection thereon to engage the sides of said first named nut.

3. In an atomizer, a body member, a sleeve removably supported in said body member, a valve stem in said sleeve, means to fasten said sleeve in said body member, and a nut on said stem operable to engage said means to regulate the amount of movement of said stem.

4. In an injector, an injector body having air and fuel passageways, a mixing chamber, means to admit fuel and air to said mixing chamber at one end above the cylinder head, remote from the cylinder into which the mixture is ejected, a fuel valve adjacent the said point of mixture, an exit valve at the other end of said mixing chamber remote from the fuel valve whereby the heat of the cylinder will not carbonize the fuel on the fuel valve and the pressure of the mixture will blow the exit valve seat clean, a common valve stem for said valves, a diaphragm on said valve stem upon which the air pressure operates to maintain said valves normally closed, means associated with the delivery of the air into the fuel to cause it to whirl in the mixing chamber, and means in the mixing chamber for straightening out the whirl into longitudinal streams prior to the exit of the mixture from the mixing chamber.

5. In a method of injection into an internal combustion engine, delivering fuel to a point outside of a cylinder in a diverging longitudinally directed stream, delivering air under pressure at right angles thereto and tangentially of the longitudinal direction of the fuel permitting the combined air and fuel to mix by whirling, straightening into a longitudinal direction the mixture and delivering to a cylinder at a point remote from the initial point of mixture.

In testimony whereof, we affix our signatures.

SAMUEL P. COWARDIN.
HARRY A. COWARDIN.